US009872003B1

(12) United States Patent
Urquhart et al.

(10) Patent No.: US 9,872,003 B1
(45) Date of Patent: Jan. 16, 2018

(54) SYSTEM AND METHOD FOR ALIGNING STACKED PROJECTORS

(71) Applicant: CHRISTIE DIGITAL SYSTEMS USA, INC., Cypress, CA (US)

(72) Inventors: Daniel Thomson Urquhart, Kitchener (CA); Nicholas David Jankovic, Waterloo (CA); Eliezer Azi Ben-Lavi, Waterloo (CA); Ryan Thomas Morris, Kitchener (CA)

(73) Assignee: CHRISTIE DIGITAL SYSTEMS USA, INC., Cypress ( * ) Notice: Subject to any disclaimer, the term of this patent is extended or adjusted under 35 U.S.C. 154(b) by 0 days.

(21) Appl. No.: 15/499,954

(22) Filed: Apr. 28, 2017

(51) Int. Cl.
*H04N 9/31* (2006.01)
*G06T 3/00* (2006.01)

(52) U.S. Cl.
CPC ......... *H04N 9/3185* (2013.01); *G06T 3/0093* (2013.01); *H04N 9/3147* (2013.01); *H04N 9/3194* (2013.01)

(58) Field of Classification Search
CPC .. H04N 9/3185; H04N 9/3147; H04N 9/3194; H04N 9/31; H04N 9/3197; G06T 3/0093
USPC ........ 348/189, 190, 745, 747, 806; 382/293; 345/4; 353/30, 69, 70, 94
See application file for complete search history.

(56) References Cited

U.S. PATENT DOCUMENTS

| | | | |
|---|---|---|---|
| 4,997,270 A | 3/1991 | Shaw | |
| 6,932,481 B2 | 8/2005 | Koyama et al. | |
| 6,940,529 B2 * | 9/2005 | Deering | H04N 9/3185 315/370 |
| 7,034,900 B2 * | 4/2006 | Yoshizawa | H04N 9/28 315/368.11 |
| 9,165,536 B2 | 10/2015 | O'Dor et al. | |
| 9,292,945 B2 | 3/2016 | Kubota | |

\* cited by examiner

*Primary Examiner* — Sherrie Hsia
(74) *Attorney, Agent, or Firm* — Perry + Currier Inc.

(57) ABSTRACT

A system and method for aligning stacked projectors is provided. A computing device is in communication with at least two projectors, configured to project images stacked onto each other, and at least one sensor configured to acquire respective images the projector images. Respective initial positions in a common space are determined of each of the projector images, from the sensor images, as well as a virtual projector image located at a common target position. Respective transforms for each of the projector images to one or more of shift and transform the projector images to the common target position of the virtual projector image. The respective transforms are applied to further first projector images to produce respective transformed projector images. The projectors are controlled to project the respective transformed projector images according to the common target position.

20 Claims, 7 Drawing Sheets

SYSTEM AND METHOD FOR ALIGNING STACKED PROJECTORS

FIELD

The specification relates generally to projectors, and specifically to a system and method for aligning stacked projectors.

BACKGROUND

Stacked projectors are generally project images that are intended to be aligned. For example, each stacked projector can project the same image, aligned onto a surface to increase the brightness of the image on the surface. In other situations, one or more of the stacked projectors can project a different image from the other stacked projectors, for example as an image surrounded by (e.g. inserted into) the aligned images projected by the other stacked projectors. However, even small differences in alignment of images projected by the stacked projectors can be noticeable to a viewer. While such alignment can be performed manually, the alignment can drift over time due to changes in the environment, and the like, requiring periodic manual maintenance. While some automatic techniques can be used to perform the alignment, such automatic techniques can be complicated to implement, requiring large processing and/or setup overhead.

SUMMARY

In general, this disclosure is directed to a system and method for stacked projector alignment in which one or more sensors, for example, a camera, are used to capture images of projected, unaligned, images from each of the stacked projectors, for example as projected onto a screen and/or surface. The images from the one or more sensors are used to determine initial positions of the projector images in a common space, such as a camera space and the like. A virtual projector image is located at a common target position in the common space, and respective transforms are determined which shift and/or transform and/or warp the images from the stacked projectors to the common target position. The transforms are applied to the images, to determine respective transformed images at the common target position, and the projectors are subsequently controlled to project the respective transformed images, aligned at the common target position.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

Furthermore, in the present specification, the term "correspondence model" refers to a model derived from a set of correspondences; the correspondence model may comprise a set of correspondence points and/or a correspondence expressed as a function (and the like), including, but not limited to, for example, a best-fit polynomial curve.

An aspect of the specification provides a system comprising: a first projector configured to project a first projector image; a second projector configured to project a second projector image stacked onto the first projector image, the first projector image and the second projector image initially out of alignment; at least one sensor configured to acquire a first image of the first projector image and a second image of the second projector image; a computing device in communication with each of the first projector, the second projector and the at least one sensor, the computing device configured to: determine, in a common space, respective initial positions of each of the first projector image, from the first image, and the second projector image, from the second image; determine, in the common space, a virtual projector image, the virtual projector image located at a common target position, in the common space, for each of the first projector image and the second projector image; determine respective transforms for each of the first projector image and the second projector image to one or more of shift and transform each of the first projector image and the second projector image to the common target position of the virtual projector image; apply the respective transforms to each of further first projector images and further second projector images to respectively produce transformed first projector images and transformed second projector images; and, control each of the first projector and the second projector to respectively project the transformed first projector images and the transformed second projector images according to the common target position.

In some implementations, the respective transforms include a warping of the first projector image and the second projector image. In some implementations, the warping includes application of a pre-defined warp to virtual projector image at the common target position.

In some implementations, the common target position is located between the respective initial positions of each of the first projector image and the second projector image.

In some implementations, the common target position is an average of the respective initial positions of each of the first projector image and the second projector image.

In some implementations, a continuously adjustable parameter is used to locate the virtual projector image at the common target position.

In some implementations, the computing device is further configured to control each of the first projector and the second projector to respectively project the transformed first projector images and a transformed second projector images according to the common target position by modifying respective video input to the first projector and the second projector.

In some implementations, the system further comprises one or more further projectors configured to project one or more further projector images stacked onto the first projector image and the second projector image, the one or more further projector images initially out of alignment with one or more of the first projector image and the second projector image, the at least one sensor further configured to acquire respective images of the one or more further projector images, the computing device in communication with the one or more further projectors, the computing device further configured to: determine further respective transforms that shift the one or more further projector images to the common target position; and control each of the one or more further projectors to respectively project respective transformed projector images according to the common target position using the further respective transforms. In some implementations, the common target position is a median of the respective initial positions of each of the first projector image, the second projector image, and the one or more further projector images.

In some implementations, the one or more sensors comprise one or more cameras, and the first image and the second image comprise respective camera images. In some implementations, the common space comprises a camera space.

In some implementations, the one or more sensors comprise one or more light sensors embedded in or adjacent to a surface onto which the first projector image and the second projector image are being projected, and the first image and the second image comprise respective sensor images. In some implementations, the common space comprises a sensor space.

In some implementations, the common space comprises one of: a space of one of the first projector and the second projector; a camera space; a screen space; and an arbitrary mathematical space.

A further aspect of the specification provides a method comprising: at a computing device in communication with each of a first projector, a second projector and at least one sensor, the first projector configured to project a first projector image, the second projector configured to project a second projector image stacked onto the first projector image, the first projector image and the second projector image initially out of alignment, and the at least one sensor configured to acquire a first image of the first projector image and a second image of the second projector image, determining, in a common space, respective initial positions of each of the first projector image, from the first image, and the second projector image, from the second image; determining, in the common space, a virtual projector image, the virtual projector image located at a common target position, in the common space, for each of the first projector image and the second projector image; determining respective transforms for each of the first projector image and the second projector image to one or more of shift and transform each of the first projector image and the second projector image to the common target position of the virtual projector image; applying the respective transforms to each of further first projector images and further second projector images to respectively produce transformed first projector images and transformed second projector images; and, controlling each of the first projector and the second projector to respectively project the transformed first projector images and the transformed second projector images according to the common target position.

In some implementations, the respective transforms include a warping of the first projector image and the second projector image. In some implementations, the warping includes application of a pre-defined warp to virtual projector image at the common target position.

In some implementations, the common target position is located between the respective initial positions of each of the first projector image and the second projector image.

In some implementations, the common target position is an average of the respective initial positions of each of the first projector image and the second projector image.

In some implementations, a continuously adjustable parameter is used to locate the virtual projector image at the common target position.

In some implementations, the computing device is further configured to control each of the first projector and the second projector to respectively project the transformed first projector images and a transformed second projector images according to the common target position by modifying respective video input to the first projector and the second projector.

In some implementations, the system further comprises one or more further projectors configured to project one or more further projector images stacked onto the first projector image and the second projector image, the one or more further projector images initially out of alignment with one or more of the first projector image and the second projector image, the at least one sensor further configured to acquire respective images of the one or more further projector images, the computing device in communication with the one or more further projectors, and the method further comprises: determining further respective transforms that shift the one or more further projector images to the common target position; and controlling each of the one or more further projectors to respectively project respective transformed projector images according to the common target position using the further respective transforms. In some implementations, the common target position is a median of the respective initial positions of each of the first projector image, the second projector image, and the one or more further projector images.

In some implementations, the one or more sensors comprise one or more cameras, and the first image and the second image comprise respective camera images. In some implementations, the common space comprises a camera space.

In some implementations, the one or more sensors comprise one or more light sensors embedded in or adjacent to a surface onto which the first projector image and the second projector image are being projected, and the first image and the second image comprise respective sensor images. In some implementations, the common space comprises a sensor space.

In some implementations, the common space comprises one of: a space of one of the first projector and the second projector; a camera space; a screen space; and an arbitrary mathematical space.

Yet a further aspect of the specification provides a non-transitory computer-readable medium storing a computer program, wherein execution of the computer program is for: at a computing device in communication with each of a first projector, a second projector and at least one sensor, the first projector configured to project a first projector image, the second projector configured to project a second projector image stacked onto the first projector image, the first projector image and the second projector image initially out of alignment, and the at least one sensor configured to acquire a first image of the first projector image and a second image of the second projector image, determining, in a common space, respective initial positions of each of the first projector image, from the first image, and the second projector image, from the second image; determining, in the common space, a virtual projector image, the virtual projector image located at a common target position, in the common space, for each of the first projector image and the second projector image; determining respective transforms for each of the first projector image and the second projector image to one or more of shift and transform each of the first projector image and the second projector image to the common target position of the virtual projector image; applying the respective transforms to each of further first projector images and further second projector images to respectively produce transformed first projector images and transformed second projector images; and, controlling each of the first projector and the second projector to respectively project the transformed first projector images and the transformed second projector images according to the common target position

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
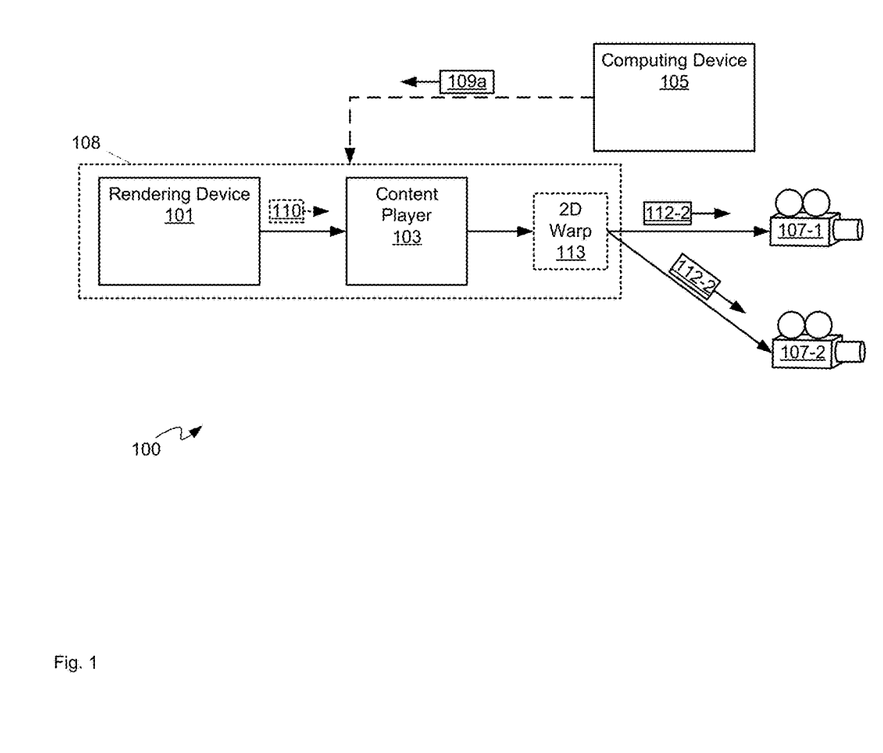
FIG. 1 depicts a projection system, according to non-limiting implementations.

FIG. 1 depicts a system 100 comprising: a rendering device 101 (interchangeably referred to hereafter as device 101); a content player 103; a computing device 105; and two or more projectors 107-1, 107-2 (interchangeably referred to collectively as projectors 107 and, generically as a projector 107). In general, device 101 is in communication with content player 103 and optionally computing device 105, and content player 103 is in communication with projector 107. As depicted, device 101 and content player 103 are combined into one device 108, however in other implementations device 101 and content player 103 can be separate devices. Computing device 105 is optionally configured to generate alignment data 109a comprising data for aligning images projected by projectors 107. Device 101 can generate rendered image data 110 from alignment data 109a, for example by rendering existing image data (not depicted) for projection by projector 107. In FIG. 1, solid lines connecting components show flow of image and/or video data there between, while the stippled line connecting computing device 105 to device 101 and/or device 108 shows flow of alignment data 109a there between.

When device 101 and content player 103 are separate, device 101 communicates image data 110 to content player 103, which processes and/or "plays" image data 110 by producing respective projection data 112-1, 112-2 (interchangeably referred to collectively as projection data 112) suitable for processing and projection by respective projectors 107. For example, image data 110 can include, but is not limited to, an AVI file, a series of JPG files, a PNG file, and the like. Projection data 112 can include, but is not limited to, HDMI data, VGA data, and/or video transport data. When device 101 and content player 103 are combined in device 108, device 108 can render projection data 112 (e.g. video data) in real-time without producing image data 110.

In any event, projection data 112 is communicated to projectors 107 by content player 103 where projection data 112 is used to control projector 107 to project images based thereupon, for example onto a three-dimensional object. In some implementations, content and/or media, such as the image data 110 is rendered in advance of "playing" the media and the content player 103 "plays" the media at a later time. For example, the system 100 is, in some implementations, distributed such that rendering of the media occurs at a production company, and the like, while a respective content player 103 is embedded in each projector 107 located at a theatre, and the like.

Device 101 generally comprises an image generator and/or renderer, for example a computing device, a server and the like, configured to generate and/or render images as image data 110. Such image data 110 can include, but is not limited to, still images, video and the like. Furthermore, while not depicted device 101 can be in communication with, and/or comprise, an image generator and/or a memory storing data from which image data 110 can be generated and/or rendered. Alternatively, device 101 can generate image data 110 using algorithms, and the like, for generating images.

Content player 103 comprises a player configured to "play" and/or render image data 110; for example, when image data 110 comprises video data, content player 103 is configured to play and/or render the video data by outputting projection data 112 for projection by projector 107. Hence, content player 103 can include, but is not limited to a video player, a video processing device, a computing device, a server, and the like. However, as described above, when device 101 and content player 103 are combined as device 108, rendering of image data 110 can be eliminated and device 108 renders projection data 112 without producing image data 110.

Computing device 105 comprises any suitable combination of projectors (including projector 107), cameras (not depicted in FIG. 1) and/or light sensors, and computing devices configured to automatically determine alignment data 109a of projectors 107. Non-limiting implementations of computing device 105, and functionality thereof, will be described below with reference to FIG. 2 to FIG. 7.

Each projector 107 comprises a projector configured to project projection data 112, including but not limited to a digital projector, a cinema projector, an LCOS (Liquid Crystal on Silicon) based projector, a DMD (digital multi-mirror device) based projector and the like. Furthermore, while only two projectors 107 are depicted, system 100 can comprise more than two projectors 107, each configured to project respective projection data comprising, for example, the same image to be stacked on one another. Regardless of a technology used in projector 107, it is assumed that projector 107, and/or other projectors described herein, includes an image modulator that includes a plurality of individual pixel modulators; for example, when a projector comprises a DMD projector, the image modulator comprises a plurality of digital micromirrors, with one micromirror for each pixel of an image to be projected.

As depicted system 100 further comprises one or more 2D ("two-dimensional") warping devices and/or modules 113, for example at projector 107 (though such a warping device can be present at content player 103 and/or as a stand-alone device) When present, projection data 112 can be warped by warping module 113, for example by moving and/or adjusting pixels within projection data 112, to adjust projection data 112 for projection by projector 107 onto an object including, but not limited to, a screen, an object and the like.

However, as computing device 105 determines alignment data 109a and communicates such to device 101 (and/or device 108), warping module 113 can be unused, optional and/or eliminated from system 100. Indeed, use of warping module 113 represents how images were processed according to the prior art and the presence of warping module 113 is obviated by virtue of computing device 105 providing device 101 (and/or device 108) with alignment data 109a. However, in some implementations, warping module 113 can be used to make small changes to projection of images onto a physical object.

While each of device 101, content player 103, computing device 105, and projectors 107 are depicted as distinct components, in other implementations, respective portions of one or more of device 101, content player 103, computing device 105, and projectors 107 and can be implemented within the same device (e.g. device 108) and/or processing resources can be shared there between. For example, while not depicted, system 100 comprises one or more controllers, one or more processors, one or more memories and one or more communication interfaces, for example a controller, memory and communication interface for each of device 101, content player 103, computing device 105, and projector 107 and/or to be shared among device 101, content player 103, computing device 105, and projectors 107. Indeed, in general, components of system 100, as depicted, represent different functionality of a projection system where: alignment data 109a of projector 107 can be automatically determined. In some implementations, system 100 includes components and/or functionality for projection mapping onto three-dimensional objects and/or for updating alignment data 109a when one or more of projectors 107 moves, and/or a screen and/or object, onto which images are being projected, moves.

Figure 2:
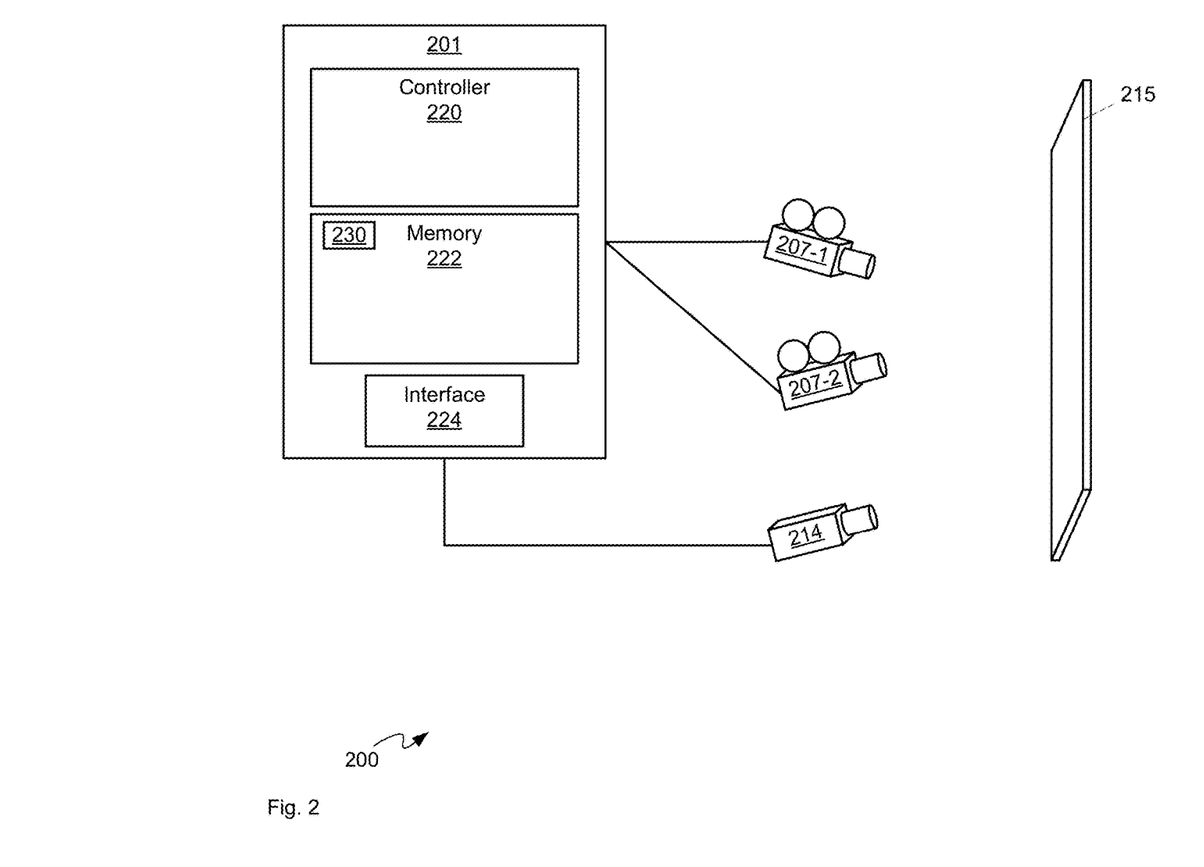
FIG. 2 depicts a system for aligning stacked projectors which can be used in the system of FIG. 1, according to non-limiting implementations.

Attention is next directed to FIG. 2 which depicts a system 200 for aligning stacked projectors. Indeed, computing device 105 can include one or more components of system 200, and furthermore components of system 100 can comprise components of system 200 as desired. System 200 comprises a computing device 201 (interchangeably referred to hereafter as device 201); a first projector 207-1 configured to project a first projector image; a second projector 207-2 configured to project a second projector image stacked onto the first projector image, the first projector image and the second projector image initially out of alignment; at least one sensor configured to acquire a first image of the first projector image and a second image of the second projector image; and a surface 215 onto which images from projector 207 are to be projected. The projectors 207-1, 207-2 are interchangeably referred to collectively as projectors 207 and, generically as a projector 207.

As depicted the at least one sensor is provided in the form of a camera 214, and the first image (e.g. of the first projector image projected by the projector 207-1) and the second image (e.g. of the second projector image projected by the projector 207-2) comprise respective camera images.

However, in other implementations, the at least one sensor can be provided as a plurality of light sensors embedded in or adjacent to surface 215 onto which the first projector image and the second projector image are being projected, and the first image and the second image comprise respective sensor images, for example a map of light intensity of the light sensors. For example, the light sensors can be provided in an array embedded into surface 215.

Hence, while implementations described herein will be with reference to the least one sensor being the camera 214, it is apparent to persons skilled in the art that the at least one sensor includes other types of sensors and/or light sensor (e.g. light sensors embedded in, and/or adjacent to, the screen 215), as long as such sensors are configured to acquire images of projected images from the projectors 207. For images acquired by the camera 214, the resolution can be higher than images acquired by light sensors; for example, for images acquired by the camera 214, numbers of pixels can be in the millions, and the like, whereas for images acquired by light sensors embedded in, and/or adjacent to the screen, the number of pixels can correspond to the number of sensors and can be as few as 6 pixels (e.g. a sensor at each corner of the screen, and two sensors in the middle, and the like, of the screen 215).

Computing device is generally in communication with each of the first projector 207-1, the second projector 207-2 and the at least one sensor (e.g. the camera 214).

It is assumed that projectors 207 are stacked and hence mounted relative to surface 215 such that images from projectors 207 can be projected onto surface 215 in alignment, though the initial assumption is that images are projected out of alignment. Further, it is assumed that camera 214 can be used to acquire camera images 414 of images projected by the projectors 207 in order to align the images projected by the projectors 207.

However, while present implementations are described with respect to surface 215 being flat (e.g. surface 215 can comprise a screen and the like), in other implementations, surface 215 can be replaced with an object, including a three-dimensional object, and projectors 207 can projection map onto the object.

In general, comparing FIG. 1 and FIG. 2, projectors 107 can comprise projectors 207, computing device 105 can comprise computing device 201, projectors 207, and camera 214, and any of device 101 and content player 103 can comprise at least a portion of computing device 201, for example when resources are shared amongst device 101, content player 103 and computing device 105. Furthermore, while two stacked projectors 207 are depicted, system 200 can comprise more than two stacked projectors. Similarly, while only one camera 214 is depicted, system 200 can comprise more than one camera 214; it is further appreciated that camera(s) 214 of system 200 can comprise a digital camera which can covey digital camera images to computing device 201.

Device 201 can comprise any suitable computing device, including but not limited to a graphics processing unit (GPU), a graphics processing device, a graphics processing engine, a video processing device, a personal computer (PC), a server, and the like, and generally comprises a controller 220, a memory 222 and a communication interface 224 (interchangeably referred to hereafter as interface 224) and optionally any suitable combination of input devices and display devices.

Interface 224 comprises any suitable wired or wireless communication interface configured to communicate with projectors 207 and camera 214 (and any of device 101, content player 103, computing device 105, and device 108 and/or any other sensors) in a wired and/or wireless manner as desired.

Controller 220 can comprise a processor and/or a plurality of processors, including but not limited to one or more central processors (CPUs) and/or one or more processing units; either way, controller 220 comprises a hardware element and/or a hardware processor. Indeed, in some implementations, controller 220 can comprise an ASIC (application-specific integrated circuit) and/or an FPGA (field-programmable gate array) specifically configured to determine at least alignment data of a projector, for example projectors 207. Hence, device 201 is preferably not a generic computing device, but a device specifically configured to implement specific alignment data determination functionality. For example, device 201 and/or controller 220 can specifically comprise a computer executable engine configured to implement specific alignment data determination functionality.

Memory 222 can comprise a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 201 as described herein are typically maintained, persistently, in memory 222 and used by controller 220 which makes appropriate utilization of volatile storage during the execution of such programming instructions. Those skilled in the art recognize that memory 222 is an example of computer readable media that can store programming instructions executable on controller 220. Furthermore, memory 222 is also an example of a memory unit and/or memory module and/or a non-volatile memory.

In particular, memory 222 stores an application 230 that, when processed by controller 220, enables controller 220 and/or computing device 201 to: determine, in a common space, respective initial positions of each of the first projector image, from the first image (e.g. as acquired by the camera 214 and/or other sensors), and the second projector image, from the second image (e.g. as acquired by the camera 214 and/or other sensors); determine, in the common space, a virtual projector image, the virtual projector image located at a common target position, in the common space, for each of the first projector image and the second projector image; determine respective transforms for each of the first projector image and the second projector image to shift each of the first projector image and the second projector image according to the common target position of the virtual projector image; apply the respective transforms to each of further first projector images and further second projector images to respectively produce transformed first projector images and transformed second projector images; and, control each of the first projector 207-1 and the second projector 207-2 to respectively project the transformed first projector images and the transformed second projector images according to the common target position.

In any event, computing device 201 and/or controller 220 is generally configured to determine alignment data 109a of projector 207, which can comprise the respective transforms.

Figure 3:
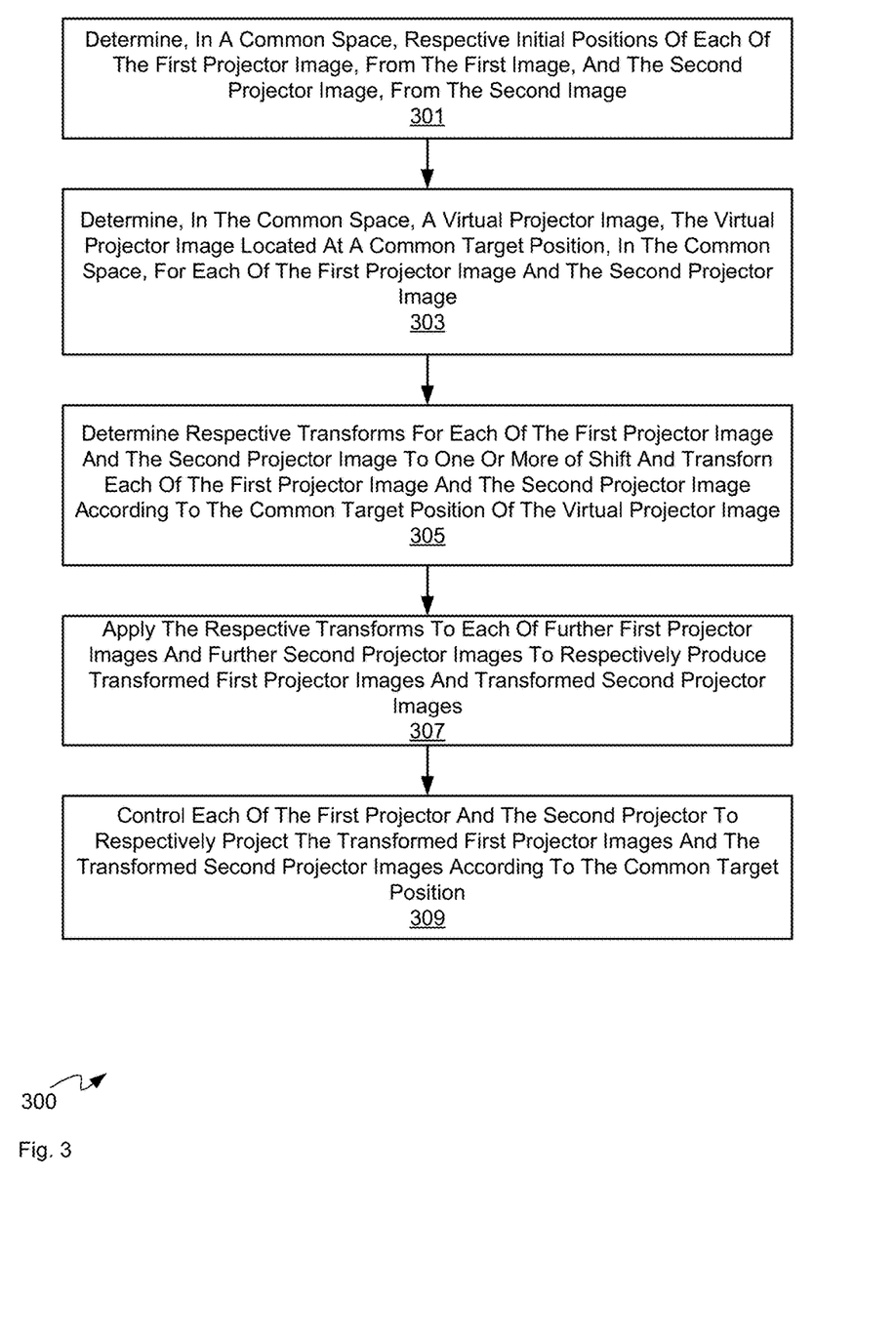
FIG. 3 depicts a method for aligning stacked projectors, according to non-limiting implementations.

Attention is now directed to FIG. 3, which depicts a flowchart of a method 300 for aligning stacked projectors, according to non-limiting implementations. In order to assist in the explanation of method 300, it will be assumed that method 300 is performed using system 200, and specifically by controller 220 of device 201, for example when controller 220 processes application 230. Indeed, method 300 is one way in which system 200 and/or device 201 can be configured. Furthermore, the following discussion of method 300 will lead to a further understanding of device 201, and system 200 and its various components. However, it is to be understood that system 200 and/or device 201 and/or method 300 can be varied, and need not work exactly as discussed herein in conjunction with each other, and that such variations are within the scope of present implementations.

Regardless, it is to be emphasized, that method 300 need not be performed in the exact sequence as shown, unless otherwise indicated; and likewise various blocks may be performed in parallel rather than in sequence; hence the elements of method 300 are referred to herein as "blocks" rather than "steps". It is also to be understood, however, that method 300 can be implemented on variations of system 200 as well. Furthermore, while computing device 201 is described as implementing and/or performing each block of method 300, it is appreciated that each block of method 300 occurs using controller 220 processing application 230.

It is further assumed in the method 300 that the camera 214 (and/or any other sensor as described above) has acquired a first image of a first projector image, and a second image of a second projector image, for example by the controller 220: controlling the first projector 207-1 to project at least one first projector image; controlling the second projector 207-1 to project at least one second projector image, at a time different from the first projector 207-1 projecting the at least one first projector (e.g. in a sequence so the images projected by each of the projectors 207 are projected at different times), for example onto the surface 215; and controlling the camera 214 to capture at least one first image of the at least one first projector image and at least one second image of the at least one second projector image.

At block 301, the computing device 201 and/or the controller 220, determines, in a common space, respective initial positions of each of the first projector image, from the first image, and the second projector image, from the second image.

At block 303, the computing device 201 and/or the controller 220, determines, in the common space, a virtual projector image, the virtual projector image located at a common target position, in the common space, for each of the first projector image and the second projector image.

At block 305, the computing device 201 and/or the controller 220, determines respective transforms for each of the first projector image and the second projector image to one or more of shift and transform each of the first projector image and the second projector image according to the common target position of the virtual projector image. Indeed, shifting the projector images can occur without otherwise warping the images, however, the shifting of the projector images can include warping and/or transforming the images. Indeed, it is appreciated that transforming the projector images, as described herein, includes shifting the projector images to the common target position of the virtual projector image and can optionally include warping the projector images to a shape of the virtual projector image at the common target position. Indeed, the transformed projector images can interchangeably referred to herein as shifted projector images, which can optionally be warped.

At block 307, the computing device 201 and/or the controller 220, applies the respective transforms to each of further first projector images and further second projector images to respectively produce transformed first projector images and transformed second projector images.

At block 309, the computing device 201 and/or the controller 220, controls each of the first projector 207-1 and the second projector 207-2 to respectively project the transformed first projector images and the transformed second projector images according to the common target position, such that the transformed first projector image and the transformed second projector image are projected as stacked images, in alignment, for example onto the surface 215.

A non-limiting example of method 300 will now be described with reference to FIG. 4 to FIG. 7.

Figure 4:
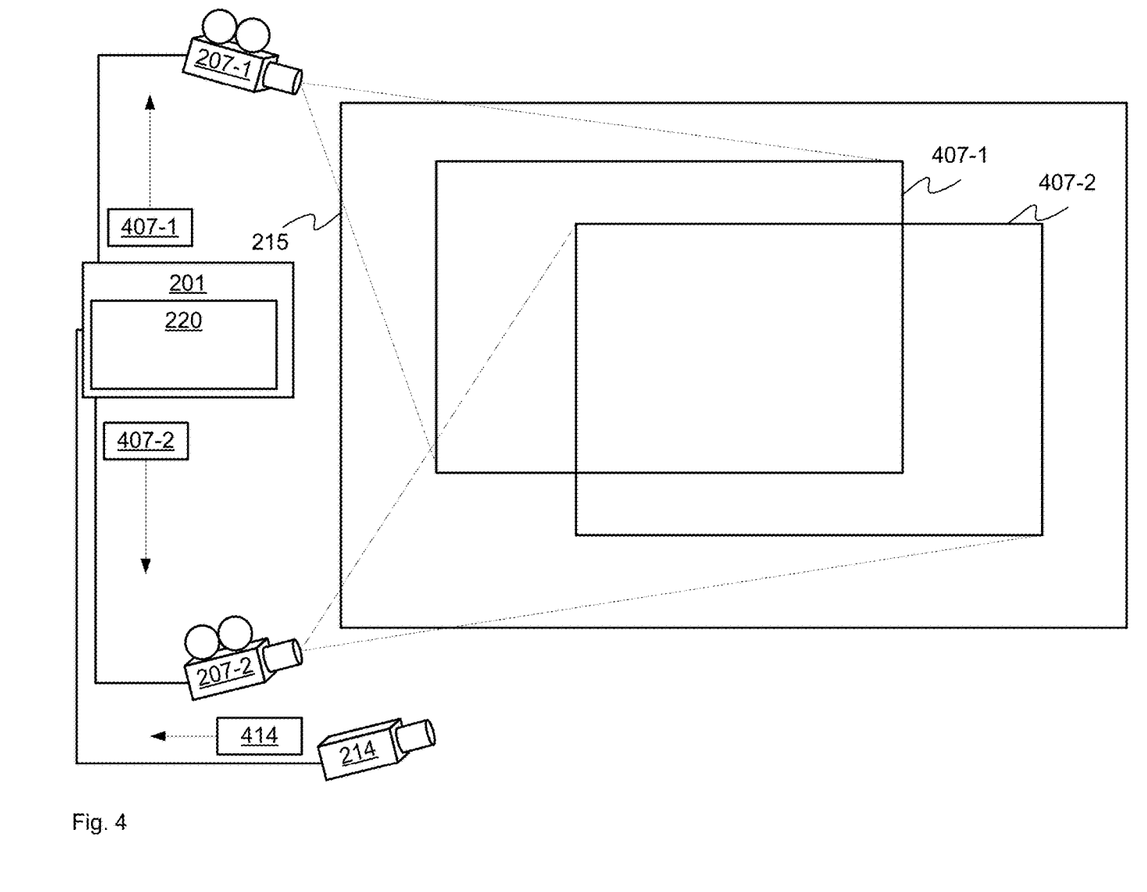
FIG. 4 depicts the projectors of the system of FIG. 2 initially projecting unaligned images, according to non-limiting implementations.

FIG. 4 depicts a schematic perspective view of the surface 215 and in particular a first projector image 407-1 projected (as indicated by respective dashed lines), by the first projector 207-1, onto the surface 215, and a second projector image 407-2 projected (as indicated by further respective dashed lines), by the first projector 207-1, onto the surface 215. The first projector image 407-1 and the second projector image 407-2 are interchangeably referred to hereafter, collectively, as projector images 407, and, generically, as a projector image 407. Furthermore, while the projector images 407 are depicted in FIG. 4 at the surface 215 concurrently, each of the projector images 407 are projected at different times. However, even if projected at the same time, the projector images 407 are out of alignment.

FIG. 4 further depicts the camera 214 in a position to capture at least one image each of the projector images 407, as well as the computing device 201 in communication with the projectors 207 and the camera 214. Indeed, it is assumed that the computing device 201 and/or the controller 220 is controlling the projectors 207 to project the projector images 407 and is controlling the camera 214 to acquire camera images 414.

Each of the projector images 407 can comprise one or more structured light patterns, for example, to generate to generate point correspondences and/or a mapping and/or a correspondence model between the projectors 207 and the camera 214 and/or the surface 215, and/or point correspondences and/or a mapping and/or a correspondence model between the first projector 207-1 and the second projector 207-2. For example, attention is directed to FIG. 5 which depicts two example structured light images 507-1, 507-2 (interchangeably referred to hereafter, collectively, as structured light images 507, and, generically, as a structured light image 507) for projection as one or more of projector images 407. Structured light image 507-1 comprises a horizontal stripe pattern and structured light image 507-2 comprises a vertical stripe pattern. Each of the structured light images 507 can be projected, sequentially, by projector 207-1 first as projector image 407-1; and then each of the structured light images 507 can be projected, sequentially, by projector 207-2 as projector image 407-2.

Figure 5:
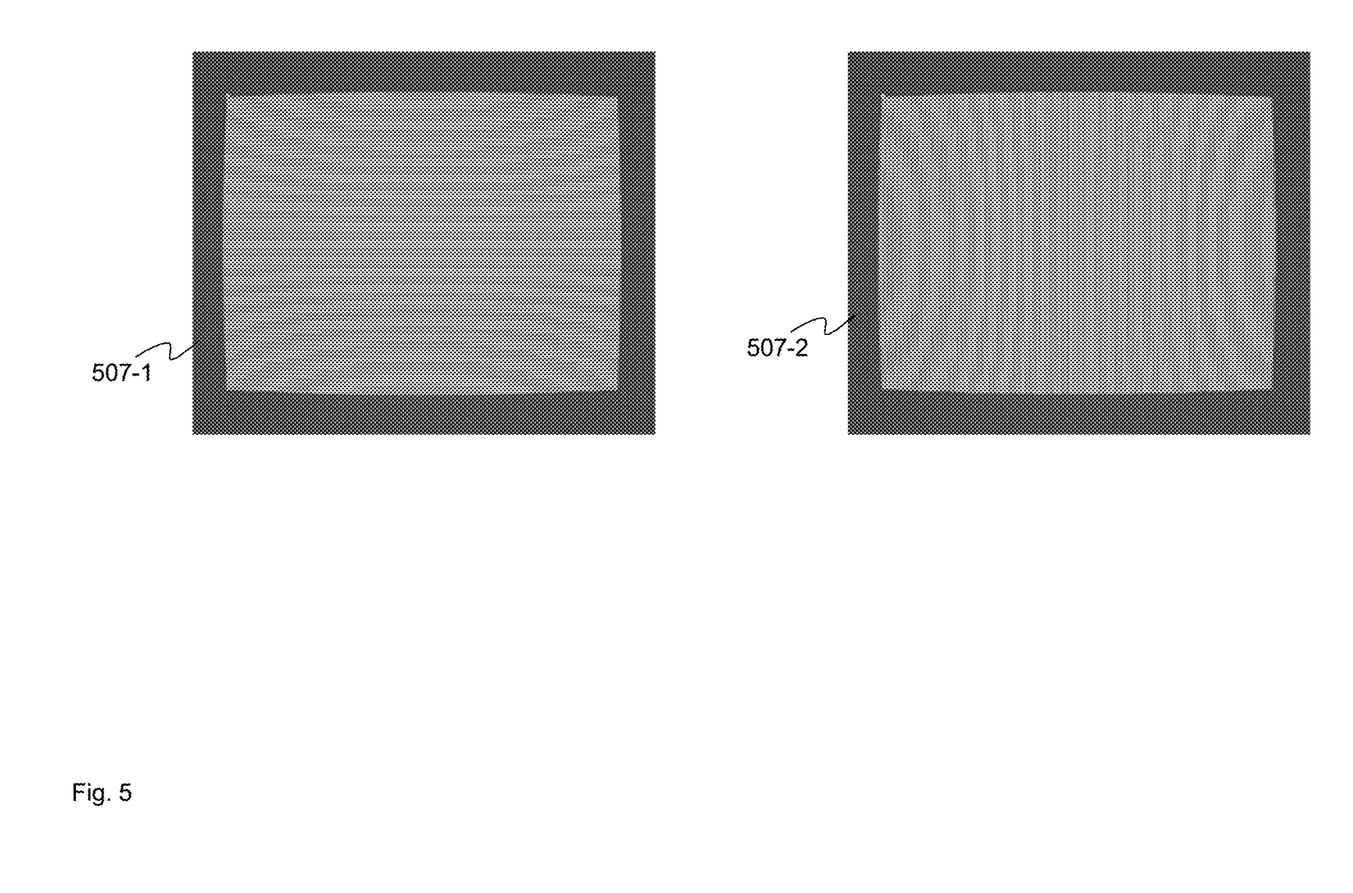
FIG. 5 depicts example structured light pattern images used to determine initial positions of projector images in a common space, according to non-limiting implementations.

As each of the projectors 207 projects the structured light images 507, the camera 214 captures a camera image 414 of each, which is received at the controller 220 which produces correspondences and/or a correspondence model between pixels and/or regions of the camera images 414 and the structured light images 507 (e.g. in corresponding projector spaces of each of the projectors 207).

In other words, as the controller 220 is controlling hardware pixels (e.g. pixel modulators) of each of the projectors 207 to project particular images pixels of the structures light images 507, the controller 220 identifies the corresponding pixels and/or region in the camera images 414 which, in turn, correspond to particular hardware pixels of the imaging device of the camera 214. As such, each of the projector images 207 are mapped into a camera space and/or by translating pixel correspondences and/or by translating correspondence models, the pixels from one projector 207 can be mapped to pixels of the other projector 207 (e.g. from one projector space to another projector space).

Depending, for example, on the resolution of the camera images 414, for the correspondence models, there could be one correspondence point per projector pixel however, due to processing constraints (such as time and the like), and/or measurement error and/or mapping error, the mapping of some correspondences (e.g, in the correspondence models) are filtered out based, for example on thresholds and/or outlier points, and the like.

In any event, the controller 220 is generally configured to use a common space, including, but not limited to, one of: a space of one of the first projector 207-1 and the second projector 207-2; a camera space; a screen space (e.g. when a physical geometry of the surface 215 is provisioned at the controller 220); an arbitrary mathematical space and a sensor space (e.g. for implementations where the sensors sensing the projected projector images 407 are embedded in and/or adjacent to the surface 215, and the like). In other words, any space to which the positions of the pixels and/or regions of the projector images 407 and the camera images 414 can be mapped against each other is within the scope of present implementations.

In particular, when the one or more sensors of the system 200 that acquire images comprise one or more cameras, such as the camera 214, the first image and the second image of the block 301 of the method 300 comprise respective camera images, such as camera images 414, and the common space can comprise a camera space. However, the camera space can also be used to translate images from one of the projectors 207 to a space of the other projector 207, and the like.

In particular, when the one or more sensors of the system 200 that acquire images comprise a plurality of light sensors embedded in or adjacent to a surface onto which the first projector image 407-1 and the second projector image 407-2 are being projected, such as the surface 215, the first image and the second image of the block 301 of the method 300 comprise respective sensor images and the common space comprise a sensor space. However, again, the sensor space can also be used to translate images from one of the projectors 207 to a space of the other projector 207, and the like.

Figure 6:
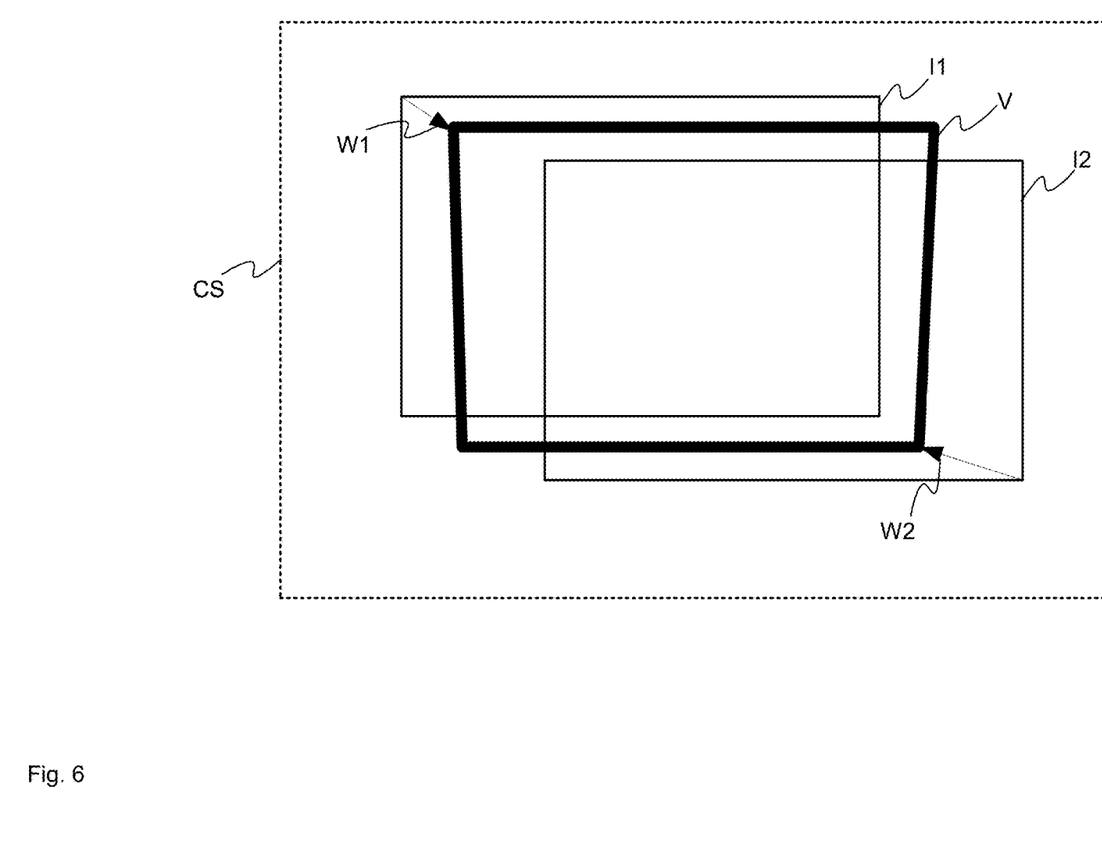
FIG. 6 depicts a determination of transforms and a virtual target image used to shift and/or transform projector images for stacking (e.g. at a position of the virtual target image), according to non-limiting implementations.

Attention is next directed to FIG. 6 which depicts a common space CS, for example a camera space, with pixel correspondence models I1, I2 of each of the projector images 407-1, 407-1 mapped thereto. In other words, a position of a pixel correspondence model I1 corresponds to a position of the projector image 407-1, and a position of a pixel correspondence model I2 corresponds to a position of the projector image 407-2. Hence, the positions of the pixel correspondence models I1, I2 in the common space CS represent an implementation of the block 301 of the method 300 in which the controller 220, determines, in the common space CS, respective initial positions (e.g. represented by the pixel correspondence models I1, I2) of each of the first projector image 407-1, from the first image (e.g. from the camera 214), and the second projector image 407-2, from the second image (e.g. from the camera 214).

Also depicted in FIG. 6 is a virtual projector image V in the common space CS which, as determined by the controller 220 at the block 303 of the method 300, is located at a common target position, in the common space CS, for each of the first projector image 407-1 and the second projector image 407-2, as represented by the pixel correspondence models I1, I2. In other words, in order to stack the first projector image 407-1 and the second projector image 407-2, the first projector image 407-1 and the second projector image 407-2 are to be moved to the common target position represented by position of the virtual projector image V.

Hence, at the block 305 of the method 300, the controller 220, determines respective transforms W1, W2 for each of the first projector image 407-1 and the second projector image 407-2 to shift each of the first projector image 407-1 and the second projector image 407-2 according to the common target position of the virtual projector image V. The transforms W1, W2 are schematically represented in FIG. 6 as respective arrows, indicating that the transforms W1, W2 are intended to shift and/or move each of the first projector image 407-1 and the second projector image 407-2 from their initial positions to the position of the virtual projector image V. As depicted, the virtual projector image V is warped with respect to the projector images 407 (and/or the pixel correspondence models I1, I2), and hence the transforms W1, W2 include a warping of the first projector image 407-1 and the second projector image 407-2, including, but not limited to, a respective keystoning of the first projector image 407-1 and the second projector image 407-2.

Furthermore, as depicted, the common target position, as represented by the virtual target image V, is located between the respective initial positions of each of the first projector image 407-1 and the second projector image 407-2. Indeed, in some implementations, the common target position is an average of the respective initial positions of each of the first projector image 407-1 and the second projector image 407-2.

However, in other implementations, the common target position can be at one or the other of the first projector image 407-1 and the second projector image 407-2 (e.g. one of the projector images 407 is to be moved to the position of the other projector images 407 with, or without, warping). For example, the virtual target image V can be located at one of the initial positions of the first projector image 407-1 or the second projector image 407-2, as represented by the pixel correspondence models I1, I2, using a continuously adjustable parameter. For example, when determining the common target position, a parameter adjustable between 0 to 1 can be used, where "0" represents a location the first projector image 407-1 (e.g. the position of the first projector image 407-1 is the common target position and/or "V=I1"), and where "1" represents a location of the second projector image 407-2 (e.g. the position of the second projector image 407-2 is the common target position and/or "V=I2"). When the continuously adjustable parameter is 0.5, the common target position is an average between the positions of the projector images 407-1, 407-2. The continuously adjustable parameter is described in further detail below.

Figure 7:
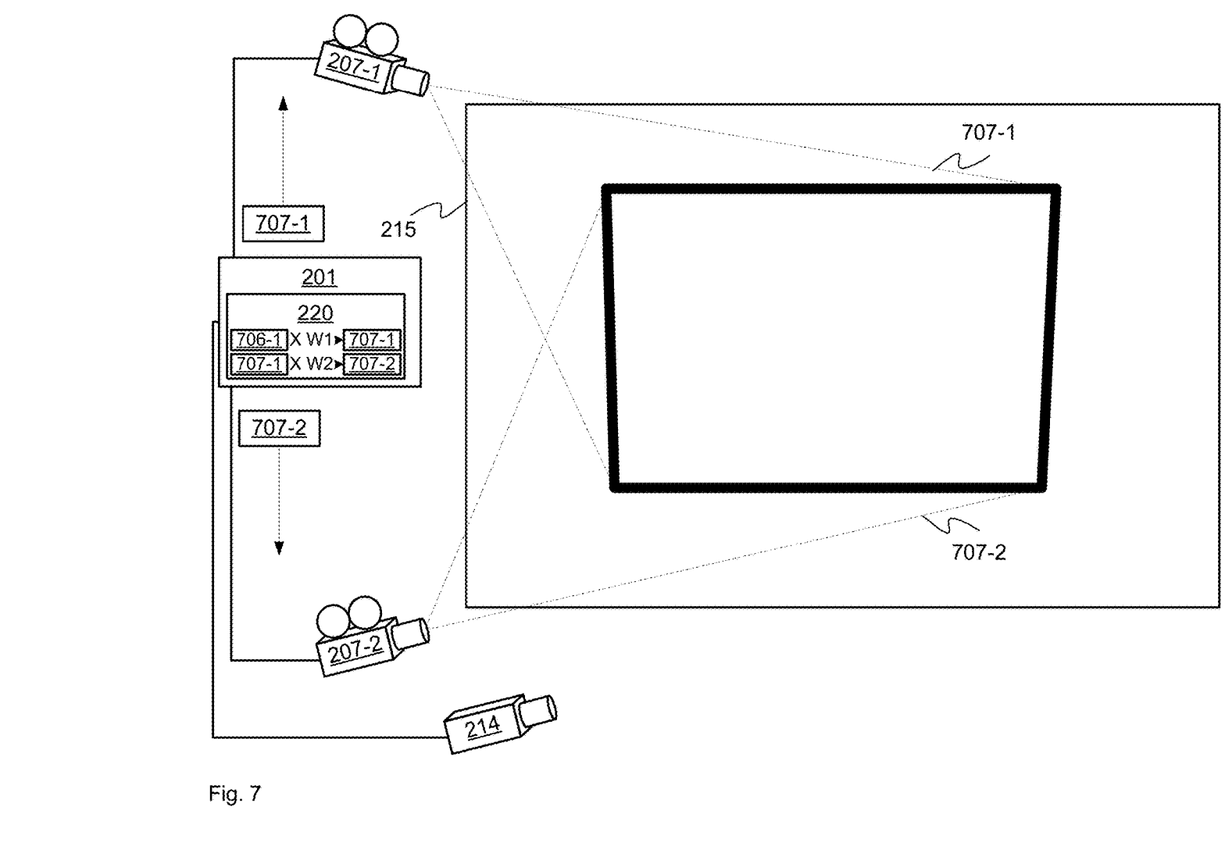
FIG. 7 depicts the projectors of the system of FIG. 2 projecting stacked images, according to non-limiting implementations.

Attention is next directed to FIG. 7 which depicts the computing device 201 and/or the controller 220 applying (e.g. at the block 307 of the method 300) the respective transforms W1, W2 to each of further first projector images 706-1 and further second projector images 707-2 to respectively produce transformed first projector images 707-1 and transformed second projector images 707-2 FIG. 7 further depicts the computing device 201 and/or the controller 220 controlling (e.g. at the block 309 of the method 300) each of the first projector 207-1 and the second projector 207-1 to respectively project the transformed first projector images 707-1 and the transformed second projector images 707-2 according to the common target position such that the projected transformed first projector images 707-1 and the transformed second projector images 707-2 are stacked onto one another at the surface 215. The projection is represented in FIG. 7 as stippled lines. Furthermore, if the transforms W1, W2 were not applied to the further projector images 706-1, 706-2, the further projector images 706-1, 706-2 would be projected at the unstacked respective positions of the projector images 407-1, 407-2. In addition, the position of the transformed first projector images 707-1 and the transformed second projector images 707-2 at the surface 215 corresponds to a position of the common target position of the virtual target image V in the common space CS.

With brief reference back to FIG. 1, in some implementations the transforms W1, W2 are provided to the rendering device 101 and/or the content player 103 and/or the warping module 113 and/or device 108 as alignment data 109a such that one or more of the rendering device 101, the content player 103, the warping module 113 and the device 108 warps content for projection by the projectors 107. In other words, the further projector images 706-1, 706-2 represent content to be projected as stored at and/or generated by, the rendering device 101, for example as video and the transformed first projector images 707-1 and the transformed second projector images 707-2 represent the images to be projected, for example as modified video, stacked on one another, after warping of the respective further projector images 706-1, 706-2 using the respective transforms W1, W2.

Indeed, with reference back to FIG. 7, the computing device 201 and/or the controller 220 can be further configured to control each of the first projector 207-1 and the second projector 207-2 to respectively project the transformed first projector images 707-1 and the transformed second projector images 707-2 according to the common target position by modifying respective video input to the first projector 207-1 and the second projector 207-1.

Persons skilled in the art will appreciate that there are yet more alternative implementations and modifications possible. For example, while the transformed first projector images 707-1 and the transformed second projector images 707-2 are projected as being completely aligned, in some implementations, the transformed second projector image 707-2 can be inset into the transformed first projector images 707-1, or vice versa. In other words, in these implementations, the stacking occurs as one of the transformed projector images 707-1, 707-2 being inset into the other of the transformed projector images 707-1, 707-2 (e.g. for example, the transformed projector image 707-1 can comprise a blank area and the transformed projector images 707-2 is stacked onto the blank area).

Persons skilled in the art will appreciate that there are yet further alternative implementations and modifications possible. For example, while the transformed first projector images 707-1 and the transformed second projector images 707-2 are projected as being shifted to cause respective alignment to the common target position between the original images 407 (e.g., in some implementations, the virtual projector image to which the images 707 are aligned may be additionally transformed, such as via a pre-defined keystone and/or warp and/or other types of warps and/or transforms, and the like. In other words, in these implementations, the stacking occurs by aligning the transformed images to a pre-defined function of the correspondence models. Similarly, the correspondence model for one or more of the projectors 207 may represent the result of some prior transform, and not as a correspondence between the native pixels (the hardware pixels) of the projector hardware. For example, in a two projector case, the second projector could be aligned with the warped pixel positions of the first projector—the first projector having been previously warped in some other manner. This configuration can enable, for example, manual alignment of one projector to achieve some "artistic" result (though defined via the correspondence models), and the like, with additional stacked projectors being configured to automatically align to the first projector, in order to reduce manual labour.

Furthermore, the method 300 is extendible to more than two projectors 207. For example, the system 200 can further comprising one or more further projectors 207 configured to project one or more further projector images 407 stacked onto the first projector image 407-1 and the second projector image 407-2, the one or more further projector images 407 initially out of alignment with one or more of the first projector image 407-1 and the second projector image 407-2, the at least one sensor (e.g. the camera 214) further configured to acquire respective images of the one or more further projector images 407, the computing device 201 in communication with the one or more further projectors 207, the computing device 201 further configured to: determine further respective transforms that shift the one or more further projector images 207 to the common target position (e.g. as represented by the position of the virtual projector image V, the one or more further projector images represented in the common space as further pixel correspondences); and control each of the one or more further projectors 207 (e.g. in addition to the projectors 207-1, 207-2) to respectively project respective transformed projector images according to the common target position using the further respective transforms.

Furthermore, in these implementations, wherein the common target position can be a median of the respective initial positions of each of the first projector image 407-1, the second projector image 407-2, and the one or more further projector images 407 (e.g. as projected by the additional projectors 207 and otherwise similar to the projector images 407-1, 407-2).

In particular, the methods described herein can be represented mathematically as follows.

A number of projectors is provided: P1, P2, P3 . . . Pn, where each of P1, P2, P3 represents a respective projector of a number "n" projectors (and generically a projector Pi, where "i" is any integer from 1 to n.

Further respective pixel correspondence models I1, I2, I3 . . . In of the projectors P1, P2, P3 . . . Pn are represented in a common space.

A set of respective virtual projector target images V1, V2, V3 . . . Vn are determined in the common space for the projectors P1, P2, P3 . . . Pn. Each virtual projector target image V1, V2, V3 . . . Vn can be determined as a function of any or all pixel correspondence models I1, I2, I3 . . . In. For example as: V1=f1(I1, I2, I3 . . . In), V2=f2(I1, I2, I3 . . . In), Vn=fn(I1, I2, I3 . . . In).

It is further understood that each virtual projector target image V1, V2, V3 . . . Vn can be at a common target position, for example, when stacking, but alternatively one or more of the virtual projector target images V1, V2, V3 . . . Vn can be at a different position.

From these function, respective transforms Wi to be applied to a projector Pi are determined such that the projected image from the projector Pi is projected according to a corresponding virtual projector target image Vi rather than a respective pixel correspondence model Ii (e.g. representing the initial unstacked position of a projection).

In some implementation, the respective transforms Wi can include additional transforms Ki applied to each virtual projector target image Vi such that the respective transforms Wi causes the projected image from a projector Pi to be projected as a warped image (as defined by the addition transforms Ki), including, but not limited to, a keystoned image.

In determining pixel correspondence model Ii, for example, in a camera space (e.g. a common space), such pixel correspondence model Ii can be generated using camera images, as described above; alternatively, and/or in addition, pixel correspondences between each pixel of each projector Pi can be mapped to a location in the camera space.

As described above, these images/correspondences can be determined by acquiring a sequence of camera images of structured light test patterns (e.g. structured light images 507-1, 507-2, and the like) projected from each projector Pi.

Regardless, the pixel correspondence model Ii is located in common space, for example as represented in the controller 220 and/or using the memory 222. Other examples of common spaces that are within the scope of present implementations include, but are not limited to, a 3D world space, a 2D screen space and the like. (Again, instead of using cameras, a number of light sensors can be in a screen, and the like, and the structured light images can be used to determine which projector pixel(s) is/are being projected onto each light sensor.)

Similarly, the common space used could be arbitrary and include, but is not limited to: camera space—which be practical to implement; a projector space of one of the projectors Pi; and a screen space, which can be either two-dimensional or three-dimensional, when using and/or inferring a screen model.

The functions fi(I1, I2, I3 . . . In) and additional transform Ki are hence dependent on the common space being used, as the type of shifting and transformation will depend on the positions and shapes of the pixel correspondence model Ii represented in the common space. However, when the camera 214 and projectors 207 are located "near" one another relative to the overall system size, the camera space and projector spaces can be similar and hence can produce similar results.

As discussed above, when the images projected from each projector Pi are to be stacked, each virtual projector target image V1, V2, V3 . . . Vn is equal to, and/or the same as a common virtual projector target image V: V1=V2==Vn=V (equivalently, f1=f2= . . . =fn=f).

When the stacking is to occur at an average position of the original positions of the projector images, then each virtual projector target image Vi=fi(I1, . . . , In)=(I1+I2+ . . . +In)/n. Hence, when there are only two projectors (e.g. n=2), as in system 200, Vi=fi(I1, I2)=(I1+I2)/2.

Alternatively, when the common virtual projector target image V is equivalent to one of the input correspondence models (e.g. an original position of one of the projector images), then each virtual projector target image Vi=fi(I1, . . . In)=$I_L$, wherein L is one of 1 . . . n.

As mentioned above, when there are two images to be projected, respective transforms can include a continuously adjustable parameter to respectively shift each of the first projector image and the second projector image to the common target position. For example, assuming two projectors (again n=2), and hence two pixel correspondence models I1, I2, such a continuously adjustable parameter a can indicate which fraction of each of two pixel correspondence models I1, I2 contributes to a position of each virtual projector target image Vi=fi(α; I1, I2)=αI1+(1−α)I2.

When the common target position is an average, α=0.5 (e.g. V1=V2=0.5I1+0.5I2. When the common target position is one or the other of the original projector image positions, α=0 or 1. For example, when α=1, and the common target position is the position of the original image from the first projector, V1=V2=I1; and when α=0, and the common target position is the position of the original image from the second projector, V1=V2=I2.

When the stacking includes an inset, one projector can be configured to warp to a sub-image of another projector, represented as follows: V1=f1(I1, I2)=I1 and V2=f2(I1, I2)=sub-image of (I1).

Keystoning in a stacked two projector case can also be described as follows. using a common virtual projector target V, an additional keystone transform K is applied a keystone distortion on the common virtual projector target V, making the virtual projector target image into K(V), and the respective transforms, W1 and W2, determined for each projector P1 and P2, result in each projector's projected image stacking onto the keystoned common virtual projector target V.

Additional transformations can be described by generalizing the keystone example above, for example, by defining K(V) to be an arbitrary pre-defined transformation of the virtual projector image. Examples of alternate functions K(V) include, but are not limited to, aspect-ratio corrections, application of a 2D spline (warp) to the target V, and the like.

In any event, described herein are systems and methods of stacking projector images which include using a common space to transform initial projector images to a common target position of a virtual projector image in a common space and subsequently using the determined transforms to shift further projector images to stack onto one another.

Those skilled in the art will appreciate that in some implementations, the functionality of devices 101, 105, 108, 201, and content player 103 can be implemented using pre-programmed hardware or firmware elements (e.g., application specific integrated circuits (ASICs), electrically erasable programmable read-only memories (EEPROMs), etc.), or other related components. In other implementations, the functionality of devices 101, 105, 108, 201, and content player 103 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A system comprising:
   a first projector configured to project a first projector image;
   a second projector configured to project a second projector image stacked onto the first projector image, the first projector image and the second projector image initially out of alignment;
   at least one sensor configured to acquire a first image of the first projector image and a second image of the second projector image;
   a computing device in communication with each of the first projector, the second projector and the at least one sensor, the computing device configured to:
      determine, in a common space, respective initial positions of each of the first projector image, from the first image, and the second projector image, from the second image;
      determine, in the common space, a virtual projector image, the virtual projector image located at a common target position, in the common space, for each of the first projector image and the second projector image;
      determine respective transforms for each of the first projector image and the second projector image to one or more of shift and transform each of the first projector image and the second projector image to the common target position of the virtual projector image;
      apply the respective transforms to each of further first projector images and further second projector images to respectively produce transformed first projector images and transformed second projector images; and,
      control each of the first projector and the second projector to respectively project the transformed first projector images and the transformed second projector images according to the common target position.

2. The system of claim 1, wherein the respective transforms include a warping of the first projector image and the second projector image.

3. The system of claim 2, wherein the warping includes application of a pre-defined warp to virtual projector image at the common target position.

4. The system of claim 1, wherein the common target position is located between the respective initial positions of each of the first projector image and the second projector image.

5. The system of claim 1, wherein the common target position is an average of the respective initial positions of each of the first projector image and the second projector image.

6. The system of claim 1, wherein a continuously adjustable parameter is used to locate the virtual projector image at the common target position.

7. The system of claim 1, wherein the computing device is further configured to control each of the first projector and the second projector to respectively project the transformed first projector images and a transformed second projector images according to the common target position by modifying respective video input to the first projector and the second projector.

8. The system of claim 1, further comprising one or more further projectors configured to project one or more further projector images stacked onto the first projector image and the second projector image, the one or more further projector images initially out of alignment with one or more of the first projector image and the second projector image, the at least one sensor further configured to acquire respective images of the one or more further projector images, the computing device in communication with the one or more further projectors, the computing device further configured to:
   determine further respective transforms that shift the one or more further projector images to the common target position; and control each of the one or more further projectors to respectively project respective transformed projector images according to the common target position using the further respective transforms.

9. The system of claim 8, wherein the common target position is a median of the respective initial positions of each of the first projector image, the second projector image, and the one or more further projector images.

10. The system of claim 1, wherein the one or more sensors comprise one or more cameras, and the first image and the second image comprise respective camera images.

11. The system of claim 10, wherein the common space comprises a camera space.

12. The system of claim 1, wherein the one or more sensors comprise one or more light sensors embedded in or adjacent to a surface onto which the first projector image and the second projector image are being projected, and the first image and the second image comprise respective sensor images.

13. The system of claim 12, wherein the common space comprises a sensor space.

14. The system of claim 1, wherein the common space comprises one of: a space of one of the first projector and the second projector; a camera space; a screen space; and an arbitrary mathematical space.

15. A method comprising:
at a computing device in communication with each of a first projector, a second projector and at least one sensor, the first projector configured to project a first projector image, the second projector configured to project a second projector image stacked onto the first projector image, the first projector image and the second projector image initially out of alignment, and the at least one sensor configured to acquire a first image of the first projector image and a second image of the second projector image, determining, in a common space, respective initial positions of each of the first projector image, from the first image, and the second projector image, from the second image;
determining, in the common space, a virtual projector image, the virtual projector image located at a common target position, in the common space, for each of the first projector image and the second projector image;
determining respective transforms for each of the first projector image and the second projector image to one or more of shift and transform each of the first projector image and the second projector image to the common target position of the virtual projector image;
applying the respective transforms to each of further first projector images and further second projector images to respectively produce transformed first projector images and transformed second projector images; and,
controlling each of the first projector and the second projector to respectively project the transformed first projector images and the transformed second projector images according to the common target position.

16. The method of claim 15, wherein the respective transforms include a warping of the first projector image and the second projector image, the warping including application of a pre-defined warp to virtual projector image at the common target position.

17. The method of claim 15, wherein the common target position is one or more of: located between the respective initial positions of each of the first projector image and the second projector image; and an average of the respective initial positions of each of the first projector image and the second projector image.

18. The method of claim 15, wherein a continuously adjustable parameter is used to locate the virtual projector image at the common target position.

19. The method of claim 15, further comprising controlling each of the first projector and the second projector to respectively project the transformed first projector images and a transformed second projector images according to the common target position by modifying respective video input to the first projector and the second projector.

20. A non-transitory computer-readable medium storing a computer program, wherein execution of the computer program is for:
at a computing device in communication with each of a first projector, a second projector and at least one sensor, the first projector configured to project a first projector image, the second projector configured to project a second projector image stacked onto the first projector image, the first projector image and the second projector image initially out of alignment, and the at least one sensor configured to acquire a first image of the first projector image and a second image of the second projector image, determining, in a common space, respective initial positions of each of the first projector image, from the first image, and the second projector image, from the second image;
determining, in the common space, a virtual projector image, the virtual projector image located at a common target position, in the common space, for each of the first projector image and the second projector image;
determining respective transforms for each of the first projector image and the second projector image to one or more of shift and transform each of the first projector image and the second projector image to the common target position of the virtual projector image;
applying the respective transforms to each of further first projector images and further second projector images to respectively produce transformed first projector images and transformed second projector images; and,
controlling each of the first projector and the second projector to respectively project the transformed first projector images and the transformed second projector images according to the common target position.

* * * * *